United States Patent [19]

Frey

[11] Patent Number: 4,779,810
[45] Date of Patent: Oct. 25, 1988

[54] SHREDDING MACHINE
[75] Inventor: Oscar M. Frey, Listowel, Canada
[73] Assignee: 683462 Ontario Limited, Listowel, Canada
[21] Appl. No.: 63,484
[22] Filed: Jun. 18, 1987
[30] Foreign Application Priority Data
  Jun. 20, 1986 [GB] United Kingdom ............... 8615075
[51] Int. Cl.⁴ ............................................. A01F 29/00
[52] U.S. Cl. .............................. 241/101 A; 241/101.7; 241/186.4; 241/280
[58] Field of Search ............... 241/101 A, 194, 101.7, 241/186.2, 186.4, 280; 414/24.6

[56] References Cited
U.S. PATENT DOCUMENTS
  3,436,028 4/1969 Koehnew et al. ............... 241/194 X FOREIGN PATENT DOCUMENTS
  1186598 5/1985 Canada.
  2100106 12/1982 United Kingdom ........... 241/101 A
  2101882 1/1983 United Kingdom ........... 241/101 A Primary Examiner—Mark Rosenbaum
Attorney, Agent, or Firm—Anthony Asquith & Co.

[57] ABSTRACT

The machine disclosed is for shredding a cylindrical hay-bale. The bale (34) is rotated about its cylindrical axis (36), and is engaged tangentially by a rotary cutter (38) with centrifugal blades (52). The bale is rotated, not by the usual conveyor or drive belt but by discrete rollers. The machine has three rollers (43) on the leading side of the cutter, and one roller (45) on the trailing side. The rollers are provided with bale-engaging teeth (72,76). The leading rollers and the cutter are positioned underneath the bale, for gravity-assisted engagement with the bale. The rotary cutter has shredder-blades (52) presented edge-on to the hay, which keeps the shredding forces low; hence, the rollers can be allowed to jam-feed the bale into the cutter, which keeps the bale moving even if the bale should contain e.g. a lump of ice.

9 Claims, 3 Drawing Sheets

SHREDDING MACHINE

This invention relates to the manner in which a bale to be shredded is manipulated in a shredding machine. The invention is described as it applies to a hay-bale shredding machine, but the invention is not limited to hay-bale shredding.

BACKGROUND OF THE INVENTION

It has become the common practice for hay cut from the fields to be collected into round—ie. cylindrical—bales. Such bales are typically 1.5 meters in diameter, and 1.5 meters long. The bales weigh 500 kg or so.

The bales have to be disintegrated in some way before the hay can be used, for example for feeding animals. There are a number of devices presently available for disintegrating the bales.

It is possible in some circumstances to disintegrate a bale of hay simply by unrolling the bale. Unfortunately, the bale will only unroll easily if the hay is dry. Also, merely unrolling the hay tends to leave the hay in large strands and clumps, with the result that the animals have some difficulty in assimilating the hay.

Machines have been developed therefore for shredding the hay from the bale. The shredding action prepares the hay for the animals much more effectively than merely unrolling the bale. The shredding action is provided by a rotary cutter which engages against the bale, and tears the hay from the bale. The invention is directed to a new manner of manipulating the bale within the shredding machine.

THE PRIOR ART

In conventional machines, it is known to allow the bale to rest on what may be termed a conveyor belt, or chain drive. Such a machine is shown in U.S. Pat. No. 4,545,716 (PEARCE, Oct. 8, 1985), another in U.S. Pat. No. 4,195,958 (VAHLKAMP, Apr. 1, 1980), and another in CA No. 1186598 (MORLOCK, May 7, 1985).

PEARCE and VAHLKAMP show machines of the kind where the hay-bale is allowed merely to unroll itself, there being no cutter or shredder means to actually tear the hay from the bale. MORLOCK shows a machine with a rotary shredder or cutter.

U.S. Pat. No. 4,396,331 (FORSTER, Aug. 2, 1983) shows discrete rollers, as opposed to conveyor belts, being used to drive a bale in rotation on a non-shredding type of machine. The invention is aimed at providing a shredding machine, i.e. a machine of the kind that includes a rotary cutter, with a much improved ability to handle bales that have been standing outside in the fields in freezing weather. Hay-bales are very difficult to shred when the bale includes a lump of ice.

The lump of ice resides at one location on the circumference of the bale. With a conventional machine of the shredding type, i.e. a machine with a rotary cutter, the bale rotates until the ice lump enters the cutter—then the bale stops rotating and the cutter stalls. It is possible to reverse the conveyor of such a machine, in an attempt to free the bale, but even so it has been, as a general rule, a difficult and time-consuming task to shred a bale which has a lump of ice in it.

To make matters worse, the lump of ice tends to subject the machine to abusive stresses and vibrations. Furthermore, if the bale includes a wet or damp area, even if that area has not turned into ice, the resulting unevenness can make the bale very hard to disintegrate.

Bales that have been standing outside in wet or icy conditions therefore cannot be merely unrolled. Wet or icy bales have to be positively shredded, and the task of shredding such bales is one that has not been adequately addressed in the previous shredding machines.

It may benoted that the most urgent need for shredded hay often arises at times when the bale is wet or icy, not when the bale is dry.

GENERAL DESCRIPTION OF THE INVENTION

In the invention, the hay-bale is driven not by a chain-drive or a conveyor-belt, but by discrete rollers.

Hay is a substance that has very little structural coherence. One of the problems of using a conveyor belt to convey hay is this, that a point on the belt which engages a point on the bale engages that same point on the bale throughout a long period of the movement of the bale. Thus, even if the belt is provided with large spikes which dig into the bale, the small area of the bale that engages the spike must retain its structural cohesiveness throughout the whole period in which the spike is in contact with that small area of hay.

It is recognised in the invention, that hay just is not strong enough to do that. The small area of hay around the spike soon collapses, with the result that the bale can easily start to slip relative to the belt. This happens even if the belt has large spikes. An analogy may be drawn with a rack-and-pinion drive, in which the hay "meshes" with teeth on the belt; in the analogy the hay "teeth" are quickly worn away. It is recognised that a belt-drive in practice is hardly more than a friction drive, because hay has virtually no structural strength.

It may be surmised that the longer the engagement between the bale and the belt, the more resistant the drive can be to slippage. It might be thought that a belt drive can be profiled to the curvature of the bale, so as to increase the length of the arc of contact between the belt and the bale. However, the diameter of the bale is not constant, but decreases as hay is shredded from the bale. There is little point therefore in profiling the belt, as a profiled belt would soon lose contact with the bale over most of its length.

When the drive-means comprises a discrete roller, as in the invention, however, the point of engagement between the bale and the roller is constantly being renewed. Directly a small area of the hay starts to break up, in the invention, the roller has already become disengaged from that area and has engaged a fresh, as-yet-undamaged, area of the bale.

It is recognised, in the invention, that spikes or teeth on the roller can be much more effective than the same size spikes or teeth would have been on a conveyor belt.

In the invention, the roller-drive ensures that the bale is unlikely to stop rotating. In a further development of the invention, respective rollers are provided which straddle the rotary cutter, one roller leading the cutter, and one roller trailing the cutter. This arrangement makes it even more unlikely that the bale can stop rotating.

It has been found in the invention that the rollers-straddling-the-cutter arrangement is extremely effective in protecting the bale from slipping relative to the drive-means. Also, if it becomes necessary to reverse the drive momentarily, to free a jammed bale, with a roller both sides the drive in reverse is as positive as the normal forward drive. This ensures that the reversal will almost always be effective to clear the jammed bale.

The machine will normally be set up so that the bale rests, under gravity, upon the leading roller or rollers, and to some extent upon the rotary cutter. The curvature of the bale means that the trailing roller cannot also be directly beneath the bale, and therefore the trailing roller cannot be engaged with the bale by gravity. The engagement of the bale with the trailing roller is therefore less assured than the engagement of the bale with the leading roller—for which reason the trailing roller may be provided with teeth or drive-spikes which are more aggressive or intrusive than those of the leading roller. This difference will be seen in the specific embodiment of the invention, which is described below.

DETAILED DESCRIPTION OF PREFERRED EMBODIMENT

The invention will now be further illustrated by the description of examples of shredding machines which incorporate the invention. The machines are shown in the accompanying drawings, in which.

Figure 1:
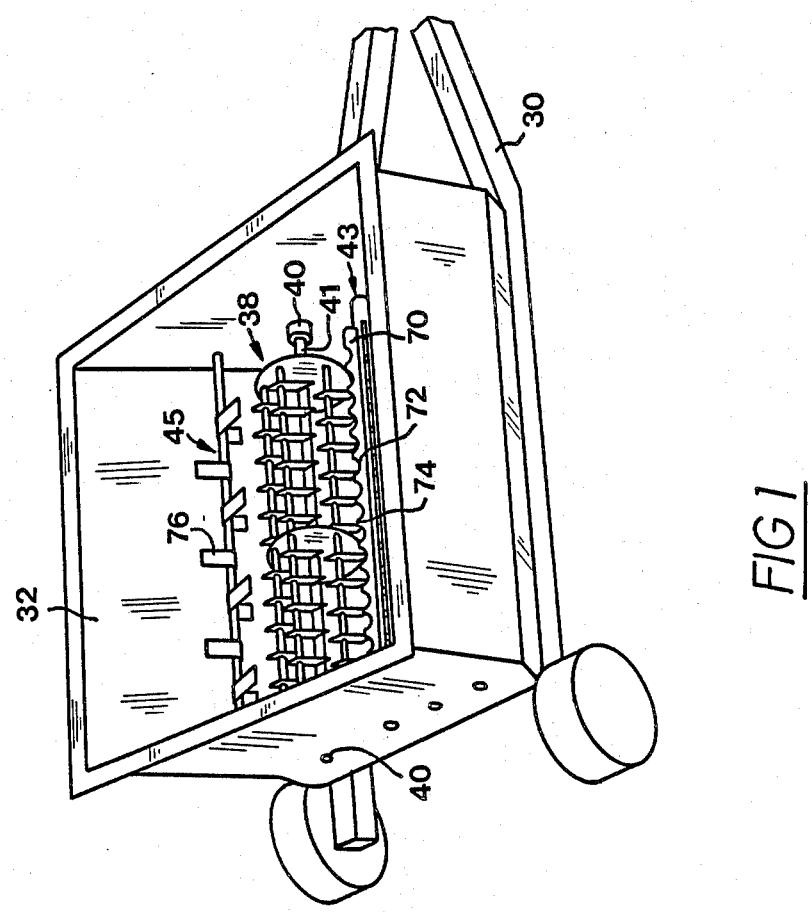
FIG. 1 is a pictorial view of a first shredding machine.

The hay-bale shredding machine comprises a machine frame 30, which is mounted on wheels and is suitable for towing behind an agricultural tractor. (The invention however is also applicable to self-powered and static shredding machines, and to shredding other materials, such as paper.)

The machine frame 30 carries a receptacle 32, which is sized to receive a spirally-rolled hay-bale 34. The hay-bale 34 lie in the receptacle 32 with the axis 36 of the bale 34 disposed horizontally, and longitudinally with respect to the machine.

A cutter-frame 38 is mounted at the bottom of the receptacle 32, in end bearings 40 disposed one at each end of the spindle 41. Three drive-rollers 43 are arranged alongside the cutter-frame 38, with their axes parallel to the axis of the cutter-frame. The receptacle 32 has no floor as such, in that the hay-bale 34 within the receptacle rests on the drive-rollers 43.

An extra drive roller 45 is located on the other side of the cutter-frame 38. The receptacle is provided with slats 47, to guide the hay-bale in the vicinity of the extra roller 45. All the drive-rollers 43, 45 are geared together, and are driven from a hydraulic motor, powered by the tractor.

The cutter-frame 38 is driven from the power-take-off shaft of the tractor. The drive-rollers 43, 45 can be reversed, when trying to clear a stalled bale, without stopping the cutter-frame.

The cutter-frame 38 includes a number of shredder-blades 52, which are mounted loosely on the rods 50. When the cutter-frame 38 is rotated, the shredder-blades 52 fly outwards due to centrifugal force.

Each shredder-blade 52 is made of a flat piece of steel, which is sharpened to a cutting-edge along one of its side-edges 56. The blades 52 all lie in plates that are radial relative to the spindle 41 of the cutter-frame 38.

When the cutter-frame 38 rotates, the shredder-blades 52 cut into the cylindrical surface of the bale 34, in a tangential direction. The shredded strands of hay follow the cutter-frame 38 around, and are guided by the shroud 58. The shredded hay is ejected from the mouth 60.

The leading drive-rollers 43 are each provided with strips 70. The strips 70 are serrated at 72 along the outermost edge 74. Six such strips 70 are provided per roller 43. The serrations 72 act as gear-teeth, to dig into the bale and to form a positive, mechanical drive-engagement with the bale.

The trailing drive-roller 45 has spikes 76, which are disposed substantially radially with respect to the roller 45. It may be noted, though, in this case the spikes are formed as bars, which are wrapped around the shaft 78 of the trailing roller 45; consequently the spikes 76 are tangential to the shaft 78 rather than strictly radial.

When the rollers are constructed in the manner described, the resulting drive-means is very effective in keeping the bale turning at all times. If the bale should tend to stop rotating, hay tends to be drawn into the area between the cutter 38 and the leading roller 43A that lies next to the cutter. This tendency of the hay to be drawn into the cutter area is one that has posed problems in previous shredding machines where the bale tends to jam, and to stall the machine.

Naturally, it is when the bale contains a block of ice, or some comparable obstruction, that the tendency for the bale to stop rotating is the greatest.

In the machine of the invention, the bale is allowed to be drawn into the cutter area if the bale tends to stop rotating. When that happens, the shredder-blades 52 will dig deeply into the bale, and the drive rollers 43, 45 also will dig deeply into the bale.

This "jam-feeding" of the bale into the cutter is only possible because the bale is so well-driven by the rollers of the invention, and especially because the shredder-blades are arranged in the edge-on, knife-type, engagement with the bale. Thus the likelihood of the bale actually stopping again is reduced in the invention.

It may be noted that the action of the trailing rollers in pushing the bale forward tends to force the bale into contact with the trailing roller. The action of the cutter blade also, insofar as that action imparts drive to the bale, also tends to push the bale into the trailing roller.

But even if the bale were actually to stop, the drive rollers, by virtue of their being rollers—as opposed to a chain belt conveyor type drive—and by virtue of the rollers being positioned either side of the cutter, can relatively easily get the bale moving again. The rollers may be momentarily reversed, which is usually sufficient to free a stopped bale.

For these reasons, the machine of the invention provides a greater freedom from stalling, and from the bales stopping, than conventional machines. The result is that the machine of the invention can shred with ease bales that have stood outside in freezing weather for some time.

Figure 2:
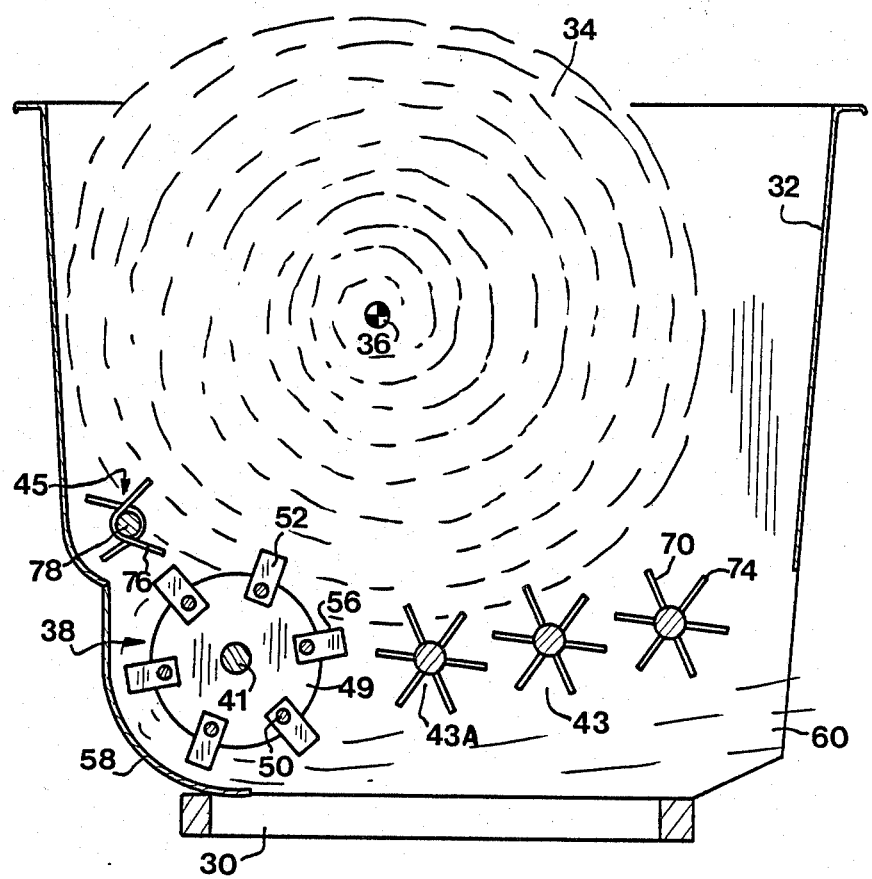
FIG. 2 is a cross-sectional elevation of the machine of FIG. 1.
Figure 3:
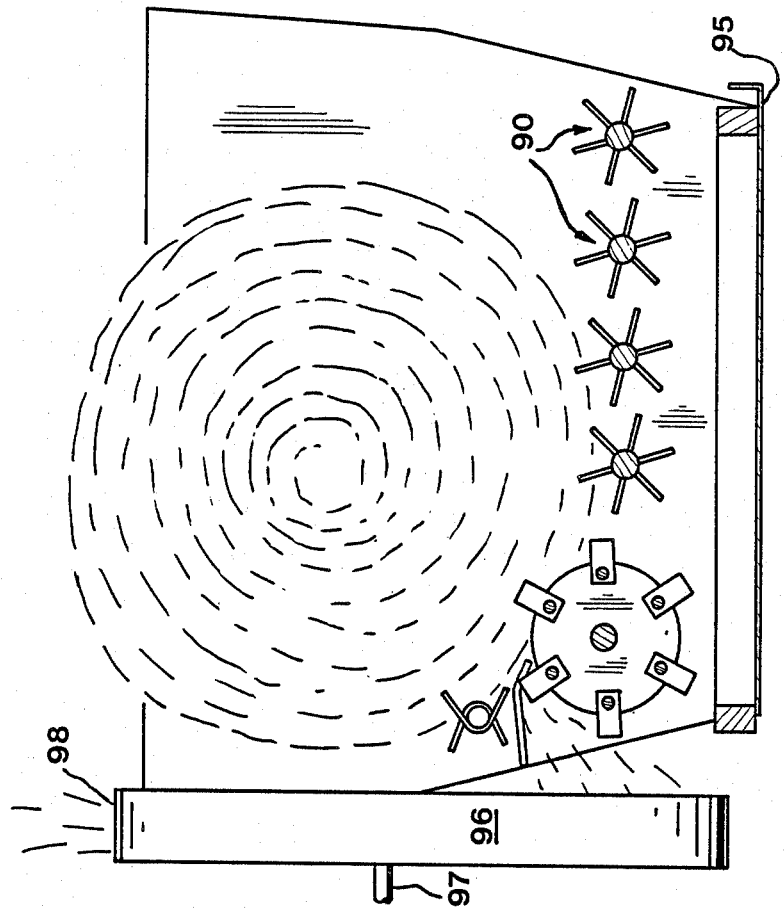
FIG. 3 is a cross-sectional elevation corresponding to FIG. 2 of a second shredding machine.

The machine shown in FIG. 3 is similar to that of FIGS. 1 and 2. In FIG. 3, the axes of the leading rollers 90 are disposed horizontally, as opposed to the axes being disposed on the slope in FIG. 2. This disposition may be preferred where the rotary cutter has a tendency to stall, because, when the leading rollers are horizontal, the action of momentarily reversing the rollers urges the bale well clear of the rotary cutter.

In FIG. 3, the hay is blown out to the left, and is collected at the bottom of the chamber 96. Inside the chamber 96 is a fan, connected to the shaft 97, which impels the hay out of the top 98 of the chamber 96. The chamber 96 may be removed, in which case the hay is deposited in a windrush if the shredding machine is towed while the bale is shredded.

In FIG. 3, a floor 95 is provided to the receptacle. The floor 95 is arranged to slide out, for cleaning purposes.

I claim:

1. Hay-bale shredding machine, characterised:

in that the machine includes a receptacle (32) which is suitable for receiving a cylindrical hay-bale;

in that the machine includes a drive-means which is placed at the bottom of the receptacle, and arranged in such a manner that a bale of hay placed within the receptacle rests on the drive-means by the action of gravity;

in that the drive means is effective to drive a hay-bale (34) placed in the receptacle in rotation about its cylindrical axis (36);

in that the machine includes a rotary cutter (38), which is mounted for rotation about an axis (41) which lies parallel to the cylindrical axis of the hay-bale;

in that the drive-means is so positioned as to keep the axis of the hay-bale horizontal as the hay-bale is shredded;

in that the axis of rotation of the cutter is horizontal;

in that the drive-means comprises at least three separate and discrete cylindrical rollers (43);

in that each roller is arranged with its axis of rotation parallel to the axis (41) of rotation of the cutter;

in that the rollers are all disposed on the leading side, circumferentially, of the rotary cutter (38);

in that each roller includes a respective bale-engagement means, which is unitary with the roller, and which comprises radially disposed teeth;

and in that the teeth are highly aggressive, in that the teeth are arranged to dig deeply and positively, and at many points, into the circumferential surface of the bale.

2. Machine of claim 1, further characterised:

in that the machine includes one further such roller (45) on the trailing side.

3. Machine of claim 2, further characterised:

in that the roller (45) on the trailing side is provided with teeth in the form of substantially radially-directed spikes (76) of considerable radial length.

4. Machine of claim 3, further characterised:

in that the rollers (43) on the leading side are provided with teeth (72) in the form of respective serrated strips (70) disposed along the length of the rollers.

5. Machine of claim 4, further characterised:

in that the said rollers (43, 45) are geared together to rotate all at the same speed.

6. Hay-bale shredding machine, characterised:

in that the machine includes a receptacle (32) which is suitable for receiving a cylindrical hay-bale;

in that the machine includes a drive-means which is placed at the bottom of the receptacle, and arranged in such a manner that a bale of hay placed within the receptacle rests on the drive-means by the action of gravity;

in that the drive means is effective to drive a hay-bale (34) placed in the receptacle in rotation about its cylindrical axis (36);

in that the machine includes a rotary cutter (38), which is mounted for rotation about an axis (41) which lies parallel to the cylindrical axis of the hay-bale;

in that the drive-means is so positioned as to keep the axis of the hay-bale horizontal as the hay-bale is shredded;

in that the axis of rotation of the cutter is horizontal;

in that the drive-means comprises a plurality of separate and discrete cylindrical rollers (43);

in that each roller is arranged with its axis of rotation parallel to the axis (41) of rotation of the cutter;

in that the rollers are all disposed on the leading side, circumferentially, of the rotary cutter (38);

in that each roller includes a respective bale-engagement means, which is unitary with the roller, and which comprises radially disposed teeth;

in that the teeth are highly aggressive, in that the teeth are arranged to dig deeply and positively, and at many points, into the circumferential surface of the bale;

in that the rotary cutter (38) comprises a frame on which are mounted many shredder-blades (52);

in that the shredder-blade are arranged each for pivoting radially outwards due to centrifugal force when the cutter rotates;

and in that the said shredder-blades (52) are arranged in edge-on, knife-type, disposition with respect to the circumference of the hay-bale (34).

7. Machine of claim 6, further characterised:

in that the rollers (43,45) and the cutter (38) extend across the full axial length of the hay-bale (34).

8. Hay-bale shredding machine, characterised:

in that the machine includes a receptacle (32) which is suitable for receiving a cylindrical hay-bale;

in that the machine includes a drive-means which is placed at the bottom of the receptacle, and arranged in such a manner that a bale of hay placed within the receptacle rests on the drive-means by the action of gravity;

in that the drive means is effective to drive a hay-bale (34) placed in the receptacle in rotation about its cylindrical axis (36);

in that the machine includes a rotary cutter (38), which is mounted for rotation about an axis (41) which lies parallel to the cylindrical axis of the hay-bale;

in that the drive-means is so positioned as to keep the axis of the hay-bale horizontal as the hay-bale is shredded;

in that the axis of rotation of the cutter is horizontal;

in that the drive-means comprises a plurality of separate and discrete cylindrical rollers (43);

in that each roller is arranged with its axis of rotation parallel to the axis (41) of rotation of the cutter;

in that the rollers are all disposed on the leading side, circumferentially, of the rotary cutter (38);

in that each roller includes a respective bale-engagement means, which is unitary with the roller, and which comprises radially disposed teeth;

in that the teeth are highly aggressive, in that the teeth are arranged to dig deeply and positively, and at many points, into the circumferential surface of the bale;

in that the machine includes a mechanical transmission means, whereby the rollers are mechanically geared together to rotate always at the same relative speeds;

in that the machine includes a mover means for rotating the cutter about its axis of rotation;

and in that the mechanical transmission means is independent from the said mover means, to the extent that motion of the rollers may be arrested, and the sense of their motion reversed, at the same time as the motion of the cutter continues in the same sense.

9. Machine of claim 8, further characterised:

in that the said mover-means includes a hydraulic pump and motor.

* * * * *